(12) United States Patent
Yuk et al.

(10) Patent No.: US 11,068,158 B2
(45) Date of Patent: Jul. 20, 2021

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Hyunsoo Yuk, Suwon-si (KR); Heejin Kwon, Suwon-si (KR); Sunyoung Kim, Suwon-si (KR); Jooyoun Kim, Suwon-si (KR); Kijun Jeong, Suwon-si (KR); Soyoung Jung, Suwon-si (KR); Seungwon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/894,396

(22) Filed: Jun. 5, 2020

(65) Prior Publication Data

US 2020/0387301 A1    Dec. 10, 2020

Related U.S. Application Data

(60) Provisional application No. 62/858,610, filed on Jun. 7, 2019.

(30) Foreign Application Priority Data

Oct. 16, 2019   (KR) ......................... 10-2019-0128366
May 25, 2020   (KR) ......................... 10-2020-0062262

(51) Int. Cl.
*G06F 3/048*    (2013.01)
*G06F 3/0488*   (2013.01)
(Continued)

(52) U.S. Cl.
CPC ........ *G06F 3/04883* (2013.01); *G06F 3/0481* (2013.01); *G06F 3/04845* (2013.01); *G06F 2203/04803* (2013.01)

(58) Field of Classification Search
CPC ............... G06F 3/04883; G06F 3/0481; G06F 3/04845; G06F 2203/04803
See application file for complete search history.

(56) References Cited

U.S. PATENT DOCUMENTS 5,063,600 A * 11/1991 Norwood ............ G06F 3/04883
                                                  382/186
8,952,906 B2    2/2015 Lee
(Continued)

FOREIGN PATENT DOCUMENTS

KR        10-1080255 B1      11/2011
KR        10-2016-0062566 A   6/2016
KR        10-2016-0116845 A  10/2016

*Primary Examiner* — David Phantana-angkool
(74) *Attorney, Agent, or Firm* — Sughrue Mion, PLLC

(57) ABSTRACT

An electronic apparatus and a method for controlling the electronic apparatus are provided, the method includes displaying an image window on a first part of a writing area of a display; displaying, based on a first user input for writing being detected on a second part of the writing area that is outside the image window, first writing information corresponding to the first user input on the writing area with a first thickness that is predetermined; and displaying, based on a second user input for writing being detected on the image window, second writing information corresponding to the second user input on the image window with a second thickness that is set according to the first thickness and a display magnification of the image window.

16 Claims, 21 Drawing Sheets

(51) Int. Cl.
*G06F 3/0481* (2013.01)
*G06F 3/0484* (2013.01)

(56) References Cited

U.S. PATENT DOCUMENTS

| | | | |
|---|---|---|---|
| 10,409,481 B2* | 9/2019 | Gao | G06K 9/222 |
| 2010/0080491 A1* | 4/2010 | Ohnishi | G06F 3/0486 |
| | | | 382/298 |
| 2012/0254773 A1* | 10/2012 | Viswanathan | G09B 5/02 |
| | | | 715/753 |
| 2013/0212535 A1* | 8/2013 | Kim | G06F 3/04886 |
| | | | 715/841 |
| 2014/0245137 A1* | 8/2014 | Kim | G06F 40/169 |
| | | | 715/268 |
| 2015/0268828 A1* | 9/2015 | Kajimoto | G06F 3/04847 |
| | | | 715/771 |
| 2016/0147723 A1 | 5/2016 | Lee et al. | |
| 2016/0378217 A1* | 12/2016 | Kim | G06F 3/0362 |
| | | | 345/173 |
| 2017/0263034 A1* | 9/2017 | Kenoff | G06F 3/04842 |
| 2020/0167033 A1* | 5/2020 | Kim | G06F 3/04845 |
| 2020/0379638 A1* | 12/2020 | Zhu | G06F 3/04842 |

* cited by examiner

| | WHEN THE SIZE OF THE ORIGINAL IMAGE IS THE SAME AS THE SIZE OF THE IMAGE WINDOW | WHEN THE SIZE OF THE IMAGE WINDOW IS SMALLER THAN THE SIZE OF THE IMAGE WINDOW | WHEN THE SIZE OF THE IMAGE WINDOW IS LARGER THAN THE SIZE OF THE IMAGE WINDOW |
|---|---|---|---|
| THICKNESS OF WRITING DESIGNATED BY A USER | ▬ | ▬ | ▬ |
| THICKNESS OF WRITING DESIGNATED BY A USER DRAWN ON AN IMAGE WINDOW | ▬ | ▬ | ▬ |
| THICKNESS OF WRITING OF THE IMAGE WINDOW SEEN BY A USER | ▬ | ▬ | ▬ |

ELECTRONIC APPARATUS AND METHOD FOR CONTROLLING THEREOF

CROSS-REFERENCE TO RELATED APPLICATIONS

This application is based on and claims priority under 35 U.S.C. § 119 to Korean Patent Application No. 10-2019-0128366, filed on Oct. 16, 2019, and Korean Patent Application No. 10-2020-0062262, filed on May 25.2020, in the Korean Intellectual Property Office, and U.S. Provisional Patent Application No. 62/858,610, filed on Jun. 7, 2019, in the United States Patent. and Trademark Office, the disclosures of which are incorporated by reference herein in their entireties.

BACKGROUND

1. Field

Embodiments of the present disclosure relate to an electronic apparatus and a method for controlling the electronic apparatus and, more particularly, to an electronic apparatus displaying writing information according to a user input that is input on a display and a method for controlling thereof.

2. Description of Related Art

Development of display technologies to achieve large, light-weight, and thin-panel displays of display devices has extended its application to an area of a blackboard for lessons and presentations, as well as in a field of conventional television (TV), a monitor, and a portable media reproduction device. For example, an electronic blackboard is an electronic device for replacing a conventional blackboard/whiteboard, in which a user touches an object on a display surface to display the content of writing on a screen. The use of the electronic blackboard has become increasingly popular because of the advantages of flexibility in configuring a screen and visual effects.

An electronic apparatus, such as an electronic blackboard, may provide an image window including a particular image as well as a writing area, such as a conventional blackboard or whiteboard. When a user input for writing is detected on the image window, the related-art electronic apparatus displays the writing information with the thickness set by a user regardless of the display magnification of the image window.

As illustrated in FIG. 1A, if the display magnification of an image window 20 is 100%, the thickness of first writing information 11 displayed on the writing area 10 and thickness of second writing information 21 displayed on the image window 20 are the same with each other. However, if the display magnification of the image window 30 is less than 100% (e.g., 80%), as shown in FIG. 1B, the thickness of third writing information 11 displayed on the image window 30 is thinner than that of the first writing information 11 displayed on the writing area 10. The related-art electronic apparatus provides the writing information of different thickness depending on the display magnification of the image window, and there is a problem in that the usability of the electronic apparatus is decreased.

SUMMARY

Embodiments of the present disclosure may overcome the above disadvantages and other disadvantages not described above.

According to embodiments, a method for controlling an electronic apparatus is provided. The method may include displaying an image window on a first part of a writing area of a display; displaying, based on a first user input for writing being detected on a second part of the writing area that is outside the image window, first writing information corresponding to the first user input on the writing area with a first thickness that is predetermined; and displaying, based on a second user input for writing being detected on the image window, second writing information corresponding to the second user input on the image window with a second thickness that is set according to the first thickness and a display magnification of the image window.

According to an embodiment, the method may further include setting the second thickness according to the display magnification of the image window such that the second writing information displayed appears to have a same thickness as the first writing information having the first thickness displayed on the second part of the writing area.

According to an embodiment, the setting the second thickness may include setting the second thickness to be thinner than the first thickness based on the display magnification of the image window exceeding 100%.

According to an embodiment, the setting the second thickness may include setting the second thickness to be the same as the first thickness based on the display magnification of the image window being 100%.

According to an embodiment, the determining the second thickness may include, setting the second thickness to be thicker than the first thickness based on the display magnification of the image window being less than 100%.

According to an embodiment, the second thickness may be set based on the following equation:

$$\text{the second thickness} = \frac{\text{the first thickness}}{\text{the display magnification of the image window}}$$

According to an embodiment, the method may further include changing the display magnification of the image window based on a third user input to change the display magnification being received while the second writing information of the second thickness is displayed on the image window, wherein the second writing information continues to have the second thickness, relative to the image window, while the display magnification is changed.

According to an embodiment, the method may further include displaying, based on a fourth user input for writing being detected on the image window of which the display magnification is changed, displaying third writing information corresponding to the fourth user input on the image window with a third thickness set according to the first thickness and the changed display magnification, wherein the third thickness is different from the second thickness.

According to an embodiment, the method may further include setting the third thickness to have a thickness smaller than the second thickness based on the display magnification being increased.

According to an embodiment, the method may further include setting the third thickness to have a thickness greater than the second thickness based on the display magnification being decreased.

According to an embodiment, the first writing information of the first thickness may be displayed on a first image layer corresponding to the writing area, and the second writing information of the second thickness may be displayed on a second image layer, corresponding to the image window, that is different from the first image layer.

According to one or more embodiments, an electronic apparatus may be provided. The electronic apparatus may include: a display; a touch panel; a memory including at least one instruction; and at least one processor connected to the display, the touch panel, and the memory. The at least one instruction, when executed by the at least one processor, may be configured to cause the at least one processor to: control the display to display an image window on a first part of a writing area of the display, detect user inputs for writing via the touch panel while the image window is displayed on the writing area, control the display to display, based on a first user input for writing being detected on a second part of the writing area that is outside the image window, first writing information corresponding to the first user input on the writing area with a first thickness that is predetermined, and control the display to display, based on a second user input for writing being detected on the image window, second writing information corresponding to the second user input on the image window with a second thickness that is set according to the first thickness and a display magnification of the image window.

According to an embodiment, the at least one instruction may be further configured to cause the at least one processor to set the second thickness according to the display magnification of the image window such that the second writing information displayed appears to have a same thickness as the first writing information having the first thickness displayed on the second part of the writing area.

According to an embodiment, the at least one instruction may be further configured to cause the at least one processor to; set the second thickness to be thinner than the first thickness based on the display magnification of the image window exceeding 100%, set the second thickness to be the same as the first thickness based on the display magnification of the image window being 100%, and set the second thickness to be thicker than the first thickness based on the display magnification of the image window being less than 100%.

According to an embodiment, the second thickness may be set based on the following equation;

$$\text{the second thickness} = \frac{\text{the first thickness}}{\text{the display magnification of the image window}}$$

According to an embodiment, the at least one instruction may be further configured to cause the at least one processor to; change the display magnification of the image window based on a third user input to change the display magnification being received while the second writing information of the second thickness is displayed on the image window, wherein the second writing information continues to have the second thickness, relative to the image window, while the display magnification is changed.

According to an embodiment, the at least one instruction may be further configured to cause the at least one processor to: control the display to display third writing information, corresponding to a fourth user input on the image window, with a third thickness set according to the first thickness and the changed display magnification, wherein the third thickness is different from the second thickness.

According to an embodiment, the at least one instruction may be further configured to cause the at least one processor to: set the third thickness to have a thickness smaller than the second thickness based on the display magnification being increased, and set the third thickness to have a thickness greater than the second thickness based on the display magnification being decreased.

According to an embodiment, the at least one instruction may be further configured to cause the at least one processor to: control the display to display the first writing information of the first thickness on a first image layer corresponding to the writing area, and control the display to display the second writing information of the second thickness on a second image layer, corresponding to the image window, that is different from the first image layer.

According to one or more embodiments, a non-transitory computer-readable storage medium storing instructions may be provided. The instructions may cause at least one processor to: display an image window on a first part of a writing area of a display; display, based on a first user input for writing being detected on a second part of the writing area that is outside the image window, first writing information corresponding to the first user input on the writing area with a first thickness that is predetermined; and display, based on a second user input for writing being detected on the image window, second writing information corresponding to the second user input on be image window with a second thickness that is determined according to the first thickness and a display magnification of the image window.

As described above, by displaying writing information with different thickness according to display magnification of an image window, an effect of improving usability of an electronic board for a user may occur.

BRIEF DESCRIPTION OF THE DRAWINGS

The above and other aspects, features, and advantages of certain embodiments of the disclosure will be more apparent from the following descriptiontaken in conjunction with the accompanying drawings, in which:

FIG. 6C is a table illustrating that thickness displayed according to display magnification of the image window is thickness seen by a user according to an embodiment;

DETAILED DESCRIPTION

Figure 1A:
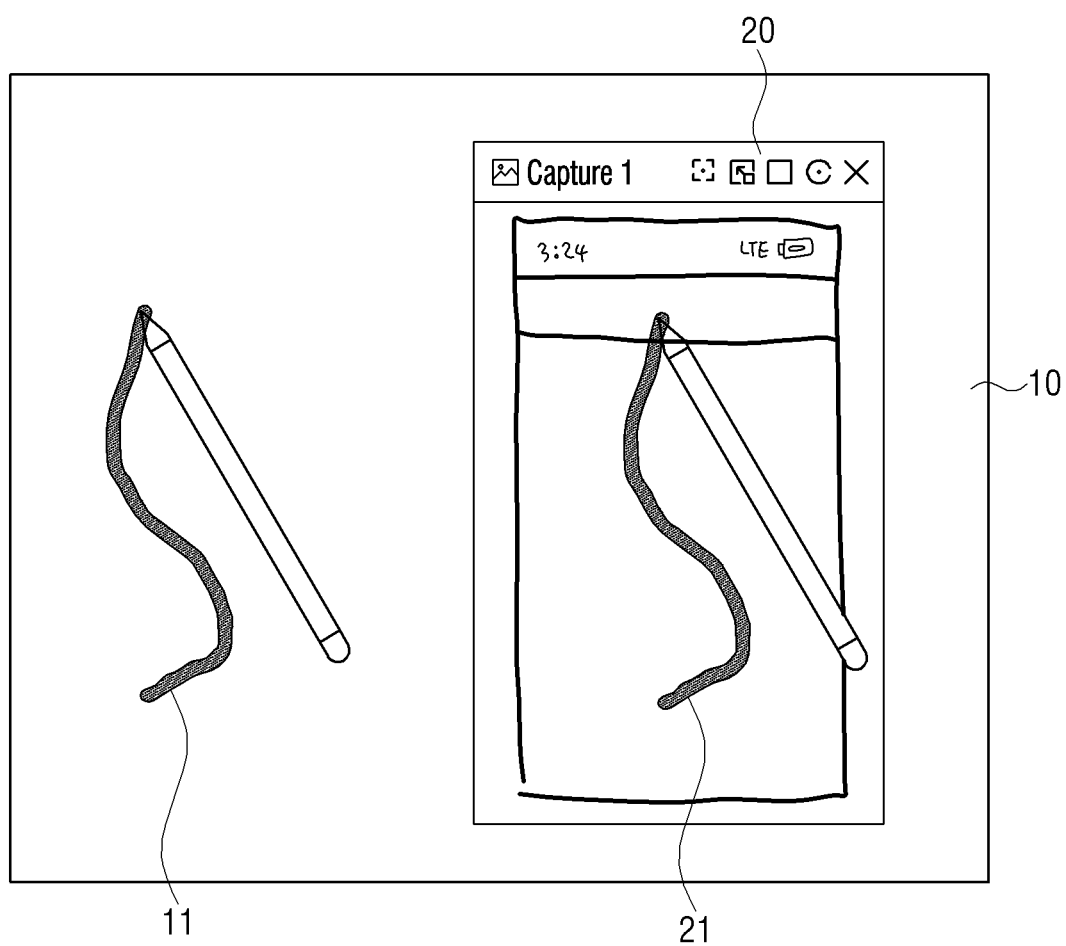
FIG. 1A is a diagram illustrating an embodiment of displaying writing information in a related art, when display magnification of an image window is 100%.
Figure 1B:
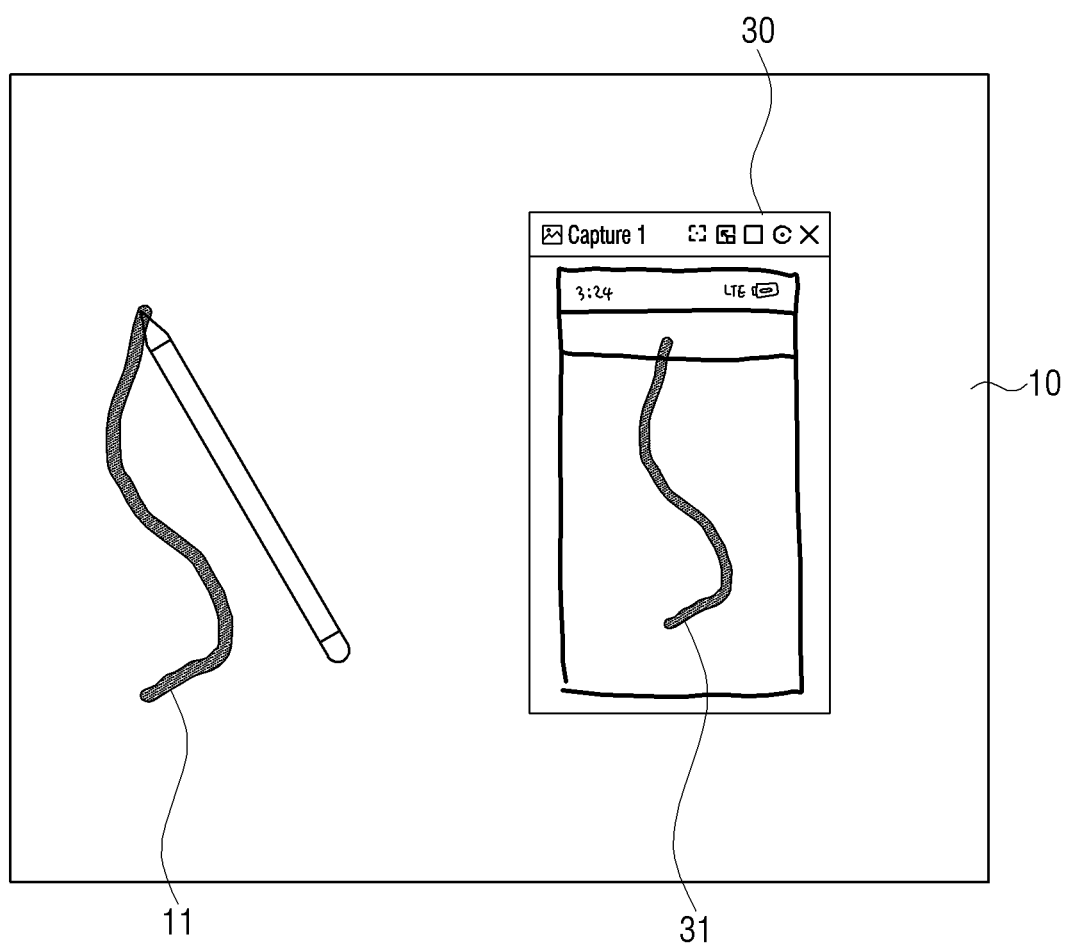
FIG. 1B is a diagram illustrating an embodiment of displaying writing information in a related art when display magnification of an image window is less than 100%.

Embodiments of the disclosure provide an electronic apparatus capable of providing, writing information in a same thickness in a writing area and in an image window regardless of display magnification of the image window, by displaying writing information with different thickness on the image window according to display magnification of the image window, and a method for controlling thereof.

Various embodiments of the disclosure are described. However, it is to be understood that the disclosure is not limited to specific embodiments, but includes various modifications, equivalents, and/or alternatives according to embodiments of the disclosure.

The terms "have", "may have", "include", and "may include" used in the example embodiments of the present disclosure indicate the presence of corresponding features (for example, elements such as numerical values, functions, operations, or parts), and do not preclude the presence of additional features.

In the description, the term "A or B", "at least one of A and/or B", or "one or more of A and/or B" may include all possible combinations of the items that are enumerated together. For example, the term "at least one of A or/and B" includes (1) including at least one A, (2) including at least one B. or (3) including both at least one A and at least one B.

In addition, expressions "first", "second", or the like, used in the disclosure may indicate various components regardless of a sequence and/or importance of the components, may be used to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor. For example, a module may be composed of an application-specific integrated circuit (ASIC).

When any component (for example, a first component) is (operatively or communicatively) coupled with/to or is connected to another component (for example, a second component), it is to be understood that any component may be directly coupled with/to another component or may be coupled with/to another component through the other component (for example, a third component). On the other hand, when any component (for example, a first component) is "directly coupled with/to" or "directly connected to" to another component (for example a second component), it is to be understood that the other component (for example, a third component) is not present between the directly coupled components.

Also, the expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily mean that a device is "specifically designed to" in terms of hardware. Instead, under some circumstances, the expression "a device configured to" may mean that the device "is capable of" performing an operation together with another device or component. For example, the phrase "a processor configured to perform A, B, and C" may mean a dedicated processor (e.g.: an embedded processor) for performing the corresponding operations, or a generic-purpose processor (e.g.: a CPU or an application processor) that can perform the corresponding operations by executing one or more software programs stored in a memory device.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as having meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

Embodiments will be further described with reference to the drawings. When detailed description for the known art related to the disclosure may unnecessarily obscure the gist of the disclosure, the detailed description will be omitted. For description of the drawings, the same reference numeral may be used for the similar element.

Figure 2:
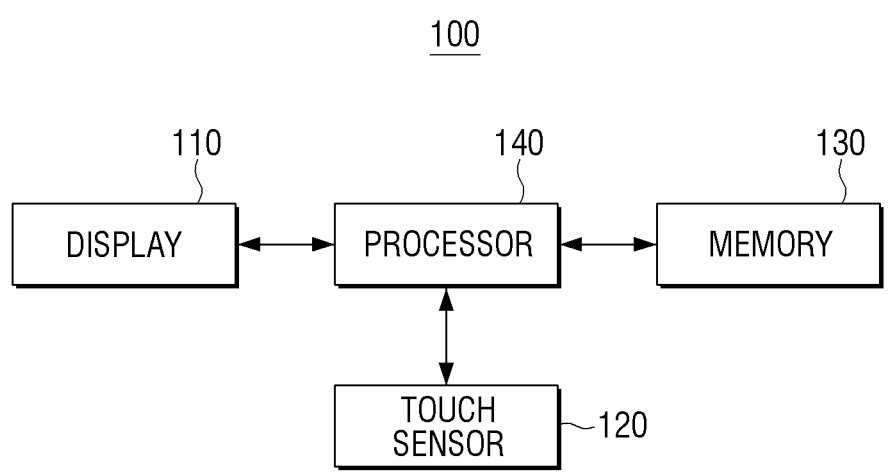
FIG. 2 is a block diagram schematically illustrating a configuration of an electronic apparatus according to an embodiment.

FIG. 2 is a block diagram schematically illustrating a configuration of an electronic apparatus according to an embodiment. As illustrated in FIG. 2, an electronic apparatus 100 may include a display 110, a touch sensor 120, a memory 130, and a processor 140. The electronic apparatus 100 according to an embodiment may be implemented as an e-board, but this is merely an example, and may be implemented as a TV or a home appliance (for example, a refrigerator, an air-conditioner, a cleaner, an oven, a microwave, a washing machine, an air purifier, a robot cleaner, a set-top box, a home automation control panel, an e-frame), or the like. The electronic apparatus 100 may be implemented as a user terminal such as a smartphone, a tablet PC, or the like.

The display 110 is capable of displaying a writing area for displaying writing information. The writing area is a single color (e.g., white, etc.) area for displaying the writing information and may be displayed on a first image layer. The display 110 may display an image window that is capable of displaying images on some areas of the writing area. The image window is a window for displaying an image selected by the user and may be displayed on a second image layer. The display 110 may display an image received from the outside (e.g., broadcast: station, set-top box, universal serial bus (USB), etc.).

The display 110 may be implemented as any of various types of displays such as a liquid crystal display (LCD), an organic light emitting diode (OLED) display; a plasma display panel (PDP), or the like. The display 110 may include a driving circuit and a backlight unit, which may be implemented in the form of an a-si TFT, a low temperature poly silicon (LTPS) TFT, an organic TFT (OTFT). The display 110 may be implemented as a touch screen coupled with a touch sensor 120.

The touch sensor 120 may detect a user touch input for inputting writing information or controlling the electronic apparatus 100. The touch sensor 120 may obtain information about a touch coordinate, a touch time, a touch pressure, or the like, and output the information to the processor 140. The touch sensor 120 may detect various touch inputs such as a drag, tap, long press, double tap, or the like. The touch sensor 120 may detect a user touch by not only the user's finger but also a stylus pen.

The memory 130 may store data and applications for providing functionality related to operations of the electronic apparatus 100. The memory 130 may be implemented as a memory embedded with the electronic apparatus 100, or may be implemented as a detachable, removable, or modular memory in the electronic apparatus 100, according to the data usage purpose. For example, data for driving the electronic apparatus 100 may be stored in a memory embedded in the electronic apparatus 100, and data for an expanded function of the electronic apparatus 100 may be stored in the memory detachable from the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash, or NOR flash), a hard disk drive or a solid state drive (SSD)). In the configuration of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USE memory) connectable to the USB port, or the like.

The processor 140 may be electrically connected to the memory 130 to control the overall operation and functioning of the electronic apparatus 100. The processor 140 may control the display 110 to display an image window on a portion of the writing area by executing at least One instruction stored in memory 130, and may detect a user input for writing via the touch sensor 120 while an image window is displayed on a portion of the writing area. In this example, when a user input is detected on the writing area, the processor 140 may control the display 110 to display the writing information corresponding to the user input on the writing area based on a determined (e.g. set) first thickness. When a user input is detected on the image window, the processor 140 may control the display 110 to display the writing information corresponding to the user input on the image window based on a second thickness determined (e.g. set) according to the display magnification of the image window and the first thickness.

The processor 140 may control the display 110 to display a writing area. When a user input for displaying an image window is detected while the writing area is displayed, the processor 140 may display an image window on a portion of the writing area. In this example, the processor 140 may process to display the writing area on the first image layer and process to display the image window on the second image layer.

If a user input for writing is detected while an image window is being displayed on a part of the writing area, the processor 140 may identify an area in which the user input is detected based on a touch coordinate. The processor 140 may display writing information with different thickness based on the detected area.

Specifically, when a user input for writing on a writing area is detected, the processor 140 may control the display 110 to display writing information corresponding to the user input on the area based on the determined first thickness. In this example, the determined first thickness may be an initially set thickness or a thickness set by a user.

When a user input for writing on the image window is detected, the processor 140 may control the display 110 to display the writing information corresponding to the user input on the image window based on the first thickness and the second thickness determined according to the display magnification of the image window. The second thickness may be determined according to the display magnification of the image window so as to appear to be the same as the first thickness displayed in the writing area.

If the display magnification of the image window is greater than 100%, the processor 140 may determine that the second thickness is thinner than the first thickness, and if the display magnification of the image window is 100%, the processor 140 may determine the second thickness to be the same as the first thickness, and if the display magnification of the image window is less than 100%, the processor 140 may determine that the second thickness is greater than the first thickness. In one example, the second thickness may be determined by Equation 1 below, $$\text{second thickness} = \frac{\text{first thickness}}{\text{display magnification of image window}} \quad [\text{Equation 1}]$$

If a user command to change the display magnification of the image window is input while the writing information of the second thickness is displayed on the image window, the processor 140 may maintain the thickness of the writing information in the second thickness while changing the display identification of the image window according to the user command. That is, if the display magnification of the image window is increased, the user may feel as if the thickness of the writing information displayed on the image window increases, and if the display magnification of the image window is reduced, the user may feel as if the thickness of the writing information displayed on the image window decreases.

When an additional user input for writing is detected on the image window in which display identification is changed through the touch sensor 120, the processor 140 may control the display 110 to display the writing information corresponding to the user input on the image window based on a third thickness determined according to the first thickness and the changed display identification. At this time, the third thickness may be different from the second thickness. That is, if the changed display magnification is higher than the existing display magnification, the processor 140 may determine that the third thickness is thinner than the second thickness, and if the modified display magnification is lower than the existing display magnification, the processor 140 may determine that the third thickness is less than the second thickness. Accordingly, if the display magnification of the image window is changed, the electronic apparatus 100 may display the writing information of the changed thickness according to the display magnification of the image window without a separate setting of the user.

Figure 3:
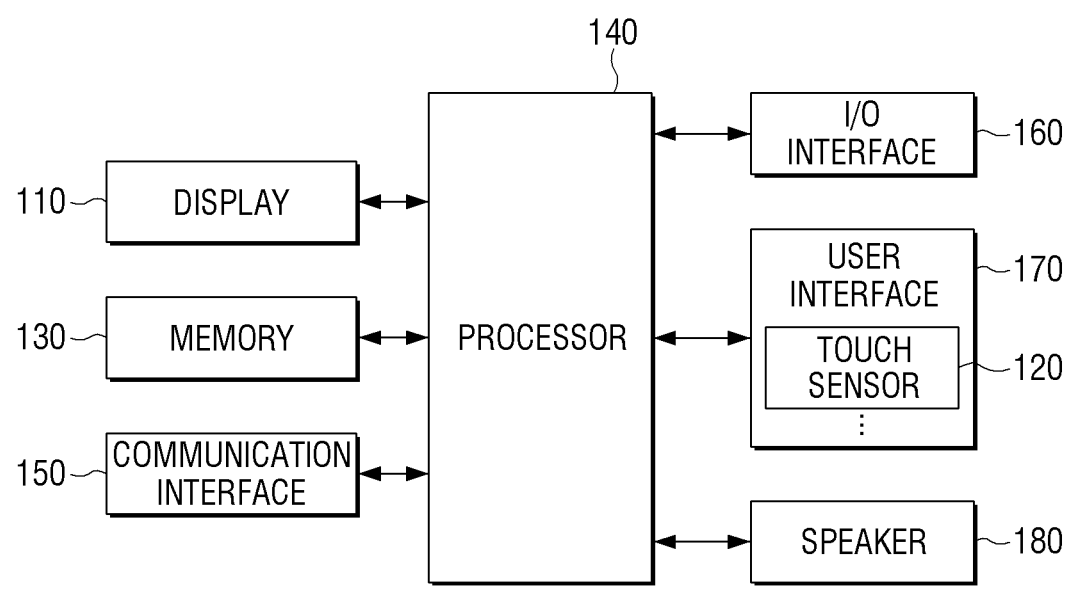
FIG. 3 is a block diagram illustrating a configuration of an electronic apparatus in detail according to an embodiment.

FIG. 3 illustrates a configuration of the electronic apparatus in detail according to an embodiment. As illustrated in FIG. 3, the electronic apparatus 100 may include the display 110, the memory 130, a communication interface ISO, an input output (I/O) interface 160, a user interface 170, a speaker 180, and the processor 140. The display 110, the memory 130, and the processor 140 have been described in FIG. 2 and will not be further described.

The communication interface 150 is configured to communicate with various types of external devices in accordance with various types of communication schemes. The communication interface 150 may include various communication modules and may perform a communication connection with an external user terminal depending on the type of communication module. For example, the communication interface 150 may include a Wi-Fi module, an infrared communication module, a Bluetooth module, a wireless communication module, or the like. The communication interface 150 may receive an image to be displayed on the image window from an external device or server. The communication interface may include at least one circuit configured to perform the communication.

The input and output interface 160 may input and output at least one of an audio signal and a video signal. The input and output interface 160 and the communication interface 150 may receive an image including at least one of a content and UI from an external device, and output a control command to an external device. The input and output interface 160 may be a high-definition multimedia interface (HDMI), but this is merely an example and the input and output interface 160 may be one interface from among mobile high-definition link (MHL), universal serial bus (USB), display port (DP), Thunderbolt, video graphics array (VGA) port, RGB port, d-subminiature (D-SUB), digital visual interface (DVI), and the like. According to an embodiment, the input and output interface 160 may include a port for inputting and outputting only an audio signal and a port for inputting and outputting only a video signal, or may be implemented as one port that inputs and outputs both the audio signal and the video signal. The processor 140 may receive an image to be displayed on the image window from an external device through the I/O interface 160.

The user interface 170 is configured to receive a user command to control the electronic apparatus 100. The user interface; 170 may include a touch sensor 120 capable of sensing user input to control the electronic apparatus 100 or to obtain writing information. The touch sensor 120 may be implemented as a touch screen (e.g., touch panel) together with the display 110. The touch sensor 120 may detect a tactile touch on the display, and may detect a proximity touch, a pressure touch, or the like. The user interface 170 may include a device such as a remote control signal receiver, a button, a mouse, and a keyboard. In an embodiment, the user interface 170 for inputting writing information is described as the touch sensor 120, but it is only one embodiment, and a user input for displaying writing information through a mouse may be obtained, and a user input for displaying writing information from an external-vice including the touch screen may be received.

The speaker 180 may be a component that outputs various audio data received from the outside through the I/O interface 160, as well as various notification sound or voice messages. The electronic apparatus 100 may include an audio output device, such as the speaker 180, and may include an output device, such as an audio output terminal. The speaker 180 may output a guidance message, or the like, associated with the currently displayed information.

Hereinafter, an embodiment will be further described with reference to FIGS. 4A to 8C.

Figure 4A:
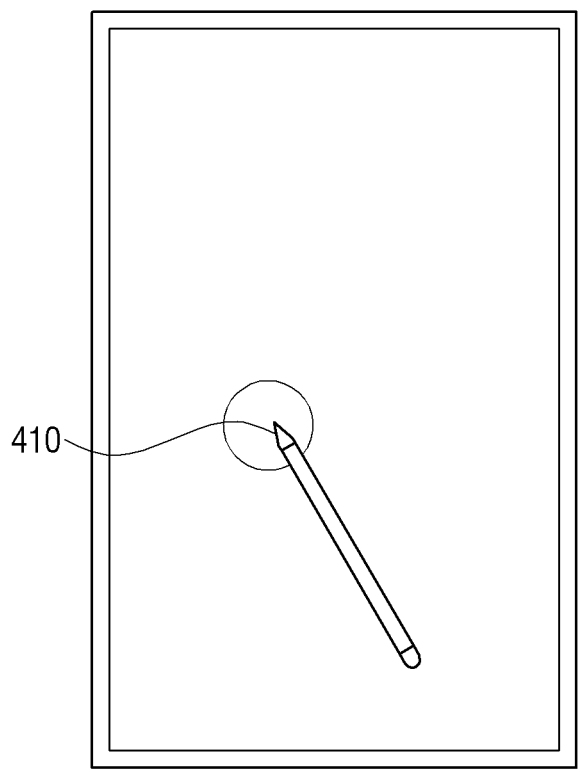
FIG. 4A is a first diagram illustrating a method for setting thickness of writing information by a user input according to an embodiment.
Figure 4B:
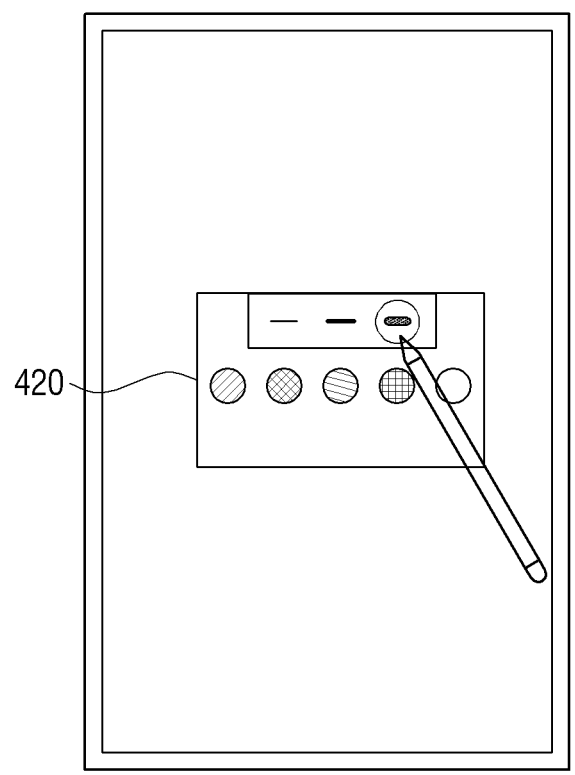
FIG. 4B is a second diagram illustrating the method for setting thickness of writing information by the user input according to the embodiment.
Figure 4C:
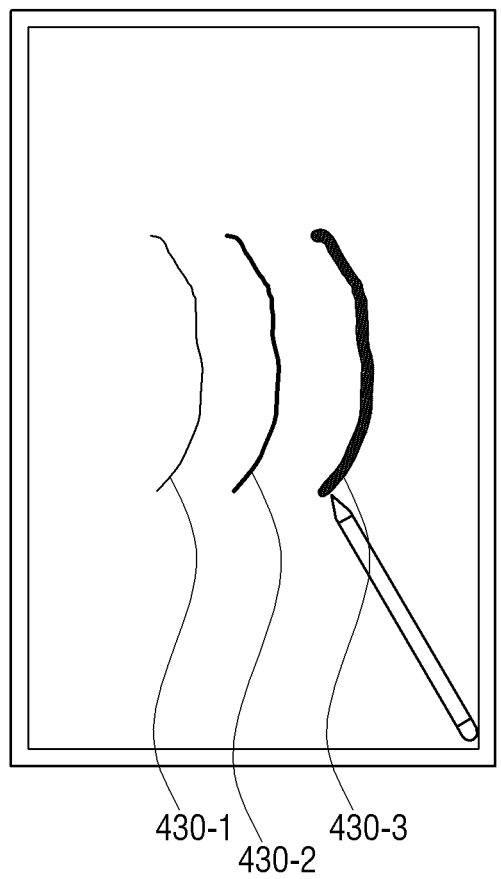
FIG. 4C is a third diagram illustrating the method the setting thickness of writing information by the user input according to the embodiment.

The electronic apparatus 100 may set thickness of the writing information displayed on the display 110 based on a user input. With reference to FIGS. 4A to 4C, a method for setting thickness of writing information according to a user input will be described.

As illustrated in FIG. 4A, when a predetermined user input 410 for an arbitrary area of the writing area is detected while the writing area is displayed, the electronic apparatus 100 may control the display 110 to display a palette user interface (UI) 420 capable of enabling a user to set at least one of the thickness and a color of the writing information, as shown in FIG. 4B. In this example, the predetermined user input 410 may be a long press touch input for touching an arbitrary area for a predetermined time, but this is only one embodiment, and may be a tap input for touching multiple times, and a depth touch input having a pressure greater than or equal to a threshold value. The palette UI 420 may be displayed around a point where a predetermined user input 410 is detected, but this is only one embodiment, and may be displayed in a predetermined area (e.g., the upper right area).

When the thickness of the writing information is selected through the palette UI 420, the electronic apparatus 100 may display the writing information with the selected thickness. For example, when a user input for writing information is received after being set to pixel, the electronic apparatus 100, as shown in FIG. 4C, may control the display 110 to display writing information 430-1 having first thickness, and when the user input for writing information is received after being set to 4 pixel, the electronic apparatus 100 may control the display 110 to display writing information 430-2 having second thickness as illustrated in FIG. 4C, and when the user input for writing information is received after being set to 8 pixel, as shown in FIG. 4C, may control the display 110 to display writing information 430-3 having a third thickness.

FIGS. 4A to 4C illustrate that thickness of writing information is set by the user input, but this is merely an example, and the first thickness may be preset by a program providing a writing function without a user input.

Figure 5A:
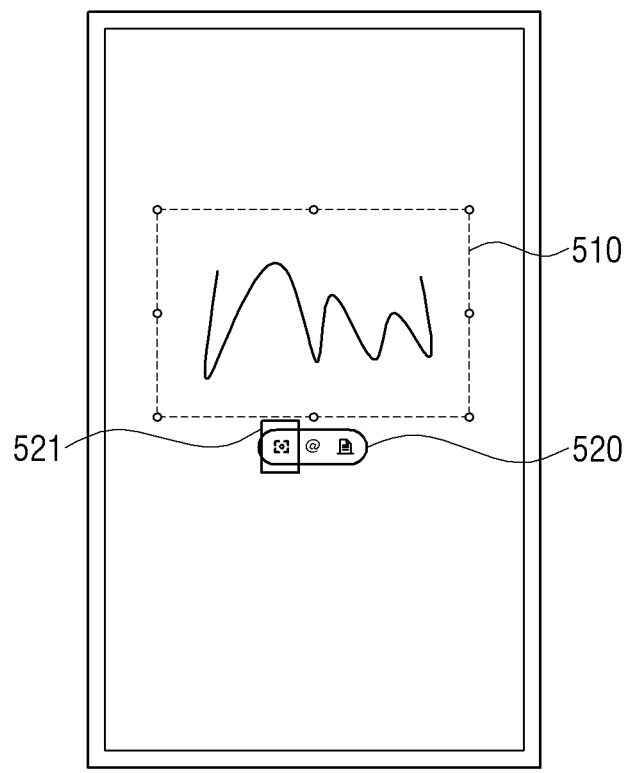
FIG. 5A is a first diagram illustrating a method for displaying an image window on a part of a writing area according to various embodiments.
Figure 5B:
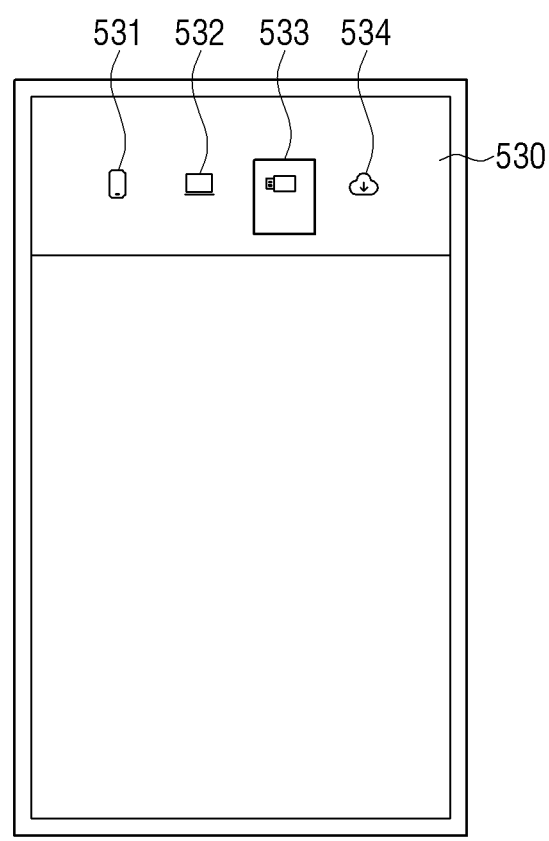
FIG. 5B is a second diagram illustrating the method for displaying the image window on the part of the writing area according to various embodiments.
Figure 5C:
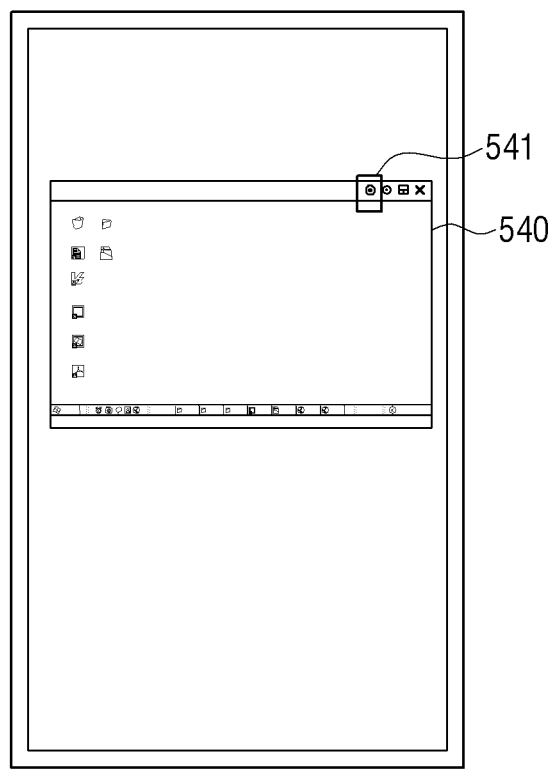
FIG. 5C is a third diagram illustrating the method for displaying the image window on the part of the writing area according to various embodiments.
Figure 5D:
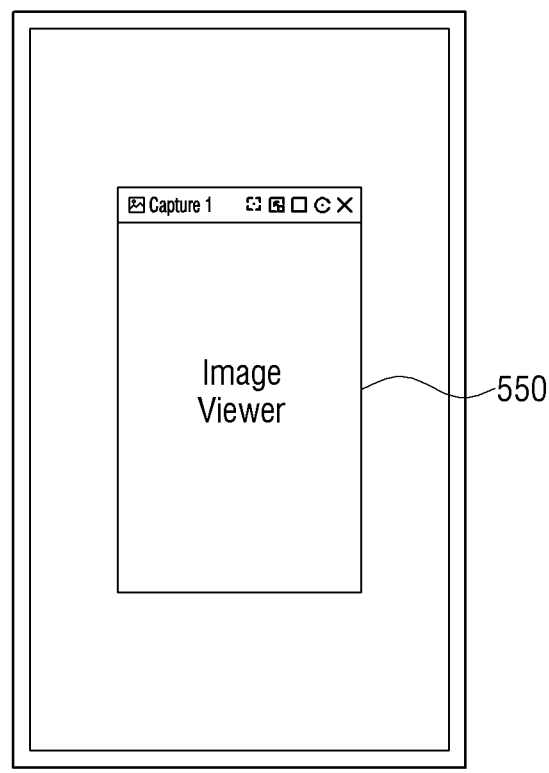
FIG. 5D is a fourth diagram illustrating the method for displaying the image window on the part of the writing area according to various embodiments.

The electronic apparatus 100 may display an image window on a portion of the writing area according to a user input. For example, the electronic apparatus 100 may capture a part of the writing areas and display the captured image on the image window. Specifically, as shown in FIG. 5A, when a first area 510 is selected according to a user drag input of the writing area, the electronic apparatus 100 may display a menu 520 for the first area 510 that is selected. The menu 520 may include an icon 521 for displaying the captured area as an image window, and if the icon 521 is selected, the electronic apparatus 100 may display an image for the first area 510, that is selected, on the image window. As another example, the electronic apparatus 100 may display an image stored on an external device on an image window. Specifically, as shown in FIG. 5B, the electronic apparatus 100 may display a menu 530 for selecting an external device for storing an image on an upper area of a screen. The menu 530 may include a first item 531 corresponding to a smart: phone, a second item 532 corresponding to a television (TV), a third item 533 corresponding to a universal serial bus (USB), and a fourth item 534 corresponding to a cloud server. When the third item 533 is selected while the menu 530 is displayed, the electronic apparatus 100 may provide a list including the image stored in the USB, and if at least one image is selected through the list, the electronic apparatus 100 may display an image window that includes at least one image. As another example, the electronic apparatus 100 may capture content displayed on a current separate screen (e.g., picture-in-picture (PIP) screen, etc.) and display an image window that includes the captured image. As illustrated in FIG. 5C, when a capture icon 541 is selected while a PIP screen 540 including a plurality of icons or a content screen is displayed, the electronic apparatus 100 may display an image window including the captured image. As illustrated in FIG. 5D, the image window illustrated in FIGS. 5A to 5C may be displayed on one area of the writing area as an image window 550 (e g., an image viewer). The image window 550 may display a captured image or an image received from the outside, and may be displayed on a second image layer different from the writing area displayed on the first image layer. When a user input for displaying writing information on the image window 550 is detected, the electronic apparatus 100 may display writing information on the image window 550. The writing information may be displayed on the second image layer on which the image window 550 is displayed.

When the user input to display the writing information is detected while an image window is displayed on a part of the writing area, the electronic apparatus 100 may determine art area for displaying writing information based on coordinate information for a starting point of the user input. For example, when a user input on the writing area begins, the electronic apparatus 100 may determine the writing area as an area for displaying writing information, and when a user input begins on an image window, the electronic apparatus 100 may determine the image window as an area for displaying the writing information. The electronic apparatus 100 may display writing information according to a user input in the determined area.

If the user input is detected on the writing area, the electronic apparatus 100 may display the writing information with the preset first thickness on the writing area, and when a user input is detected on the image window, the electronic apparatus 100 may display the writing information on the image window based on the second thickness determined according to the preset first thickness and the display magnification of the image window.

The second thickness may be determined according to the display magnification of the image window so as to look the same as the first thickness displayed on the writing area. When the display magnification of the image window exceeds 100%, the electronic apparatus 100 may determine that the second thickness to be thinner than the first thickness, and if the display magnification of the image window is less than 100%, the electronic apparatus 100 may determine that the second thickness is thicker than the first thickness.

Figure 6A:
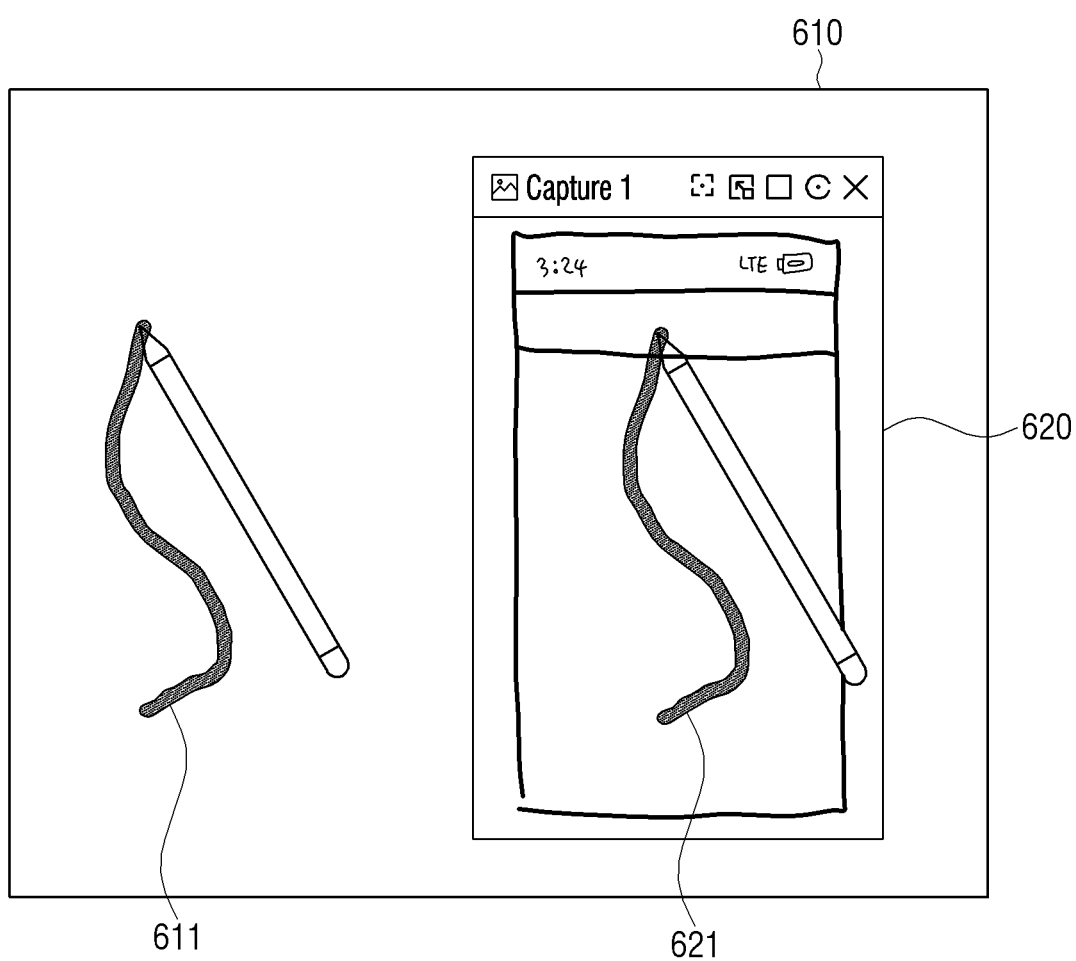
FIG. 6A is a diagram illustrating an embodiment of displaying writing information when display magnification of an image window is 100% according to an embodiment.
Figure 6B:
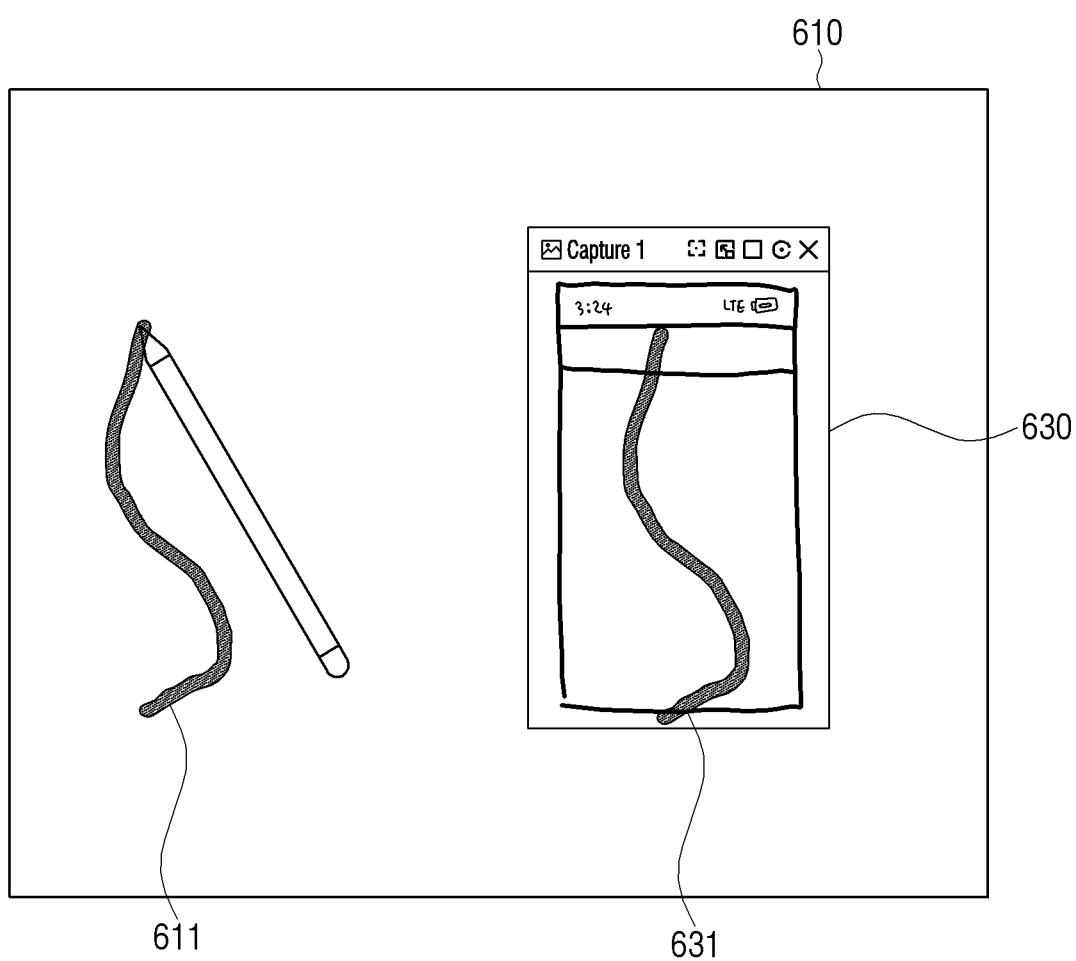
FIG. 6B is a diagram illustrating an embodiment of displaying writing information when the display magnification of the image window is less than 100% according to an embodiment.

As illustrated in FIG. 6A, when the user input for first writing information 611 is received in a writing area 610, the electronic apparatus 100 may display the first writing information 611 in the first thickness on the writing area 610. As illustrated in FIG. 6A, if a user input for second writing information 621 is received on an image window 620 of which display magnification is 100%, the electronic apparatus 100 may display second writing information 612 in the first thickness on the image window 620, As illustrated as FIG. 6B, if a user input for third writing information 631 is received on the image window 630 of which display magnification is less than 100%, the electronic apparatus 100 may display the third writing information 631 with the second thickness which is thicker than the first thickness on the image window 630. By increasing the thickness of the writing information as much as decrease in the display magnification of the image window 630, the thickness of the first writing information 611 and the thickness of the third writing information 631 may look the same.

As illustrated in the table 650 of FIG. 6C, the electronic apparatus 100 may display writing information with different thickness according to the display magnification (that is, a ratio of the size of the original image to the size currently displayed on the image window) of the image window, even though the thickness of writing designated by a user is all the same. For example, when the size of the original image is the same as the size of the image window (that is, the display magnification is 100%), the thickness of the writing drawn on the image window that is designated by the user and the thickness of writing on the image window seen by a user may be the same. If the size of the original image is less than the size of the image window (that is, the display magnification is less than 100%), the thickness of the writing drawn on the image window, relative to the image window, may be thicker than the thickness of the writing designated by the user. Even if the size of the image window gets smaller, the thickness of writing of the image window seen by the user may look the same as the thickness of the writing designated by the user. Alternatively, if the size of the image window is greater than the size of the original image (that is, the display magnification exceeds 100%), the thickness of the writing drawn on the image window, relative to the image window, may be thinner than the thickness of the writing designated by the user. By this, even though the size of the image window gets larger, the writing thickness of the image window seen by a user may be the same as the writing thickness designated by the user.

The second thickness displayed on the image window may be determined by Equation 2 below, but is not limited thereto.

$$\text{Second thickness} = \frac{\text{first thickness}}{\text{display magnification of image window}} \quad \text{[Equation 2]}$$

Figure 7A:
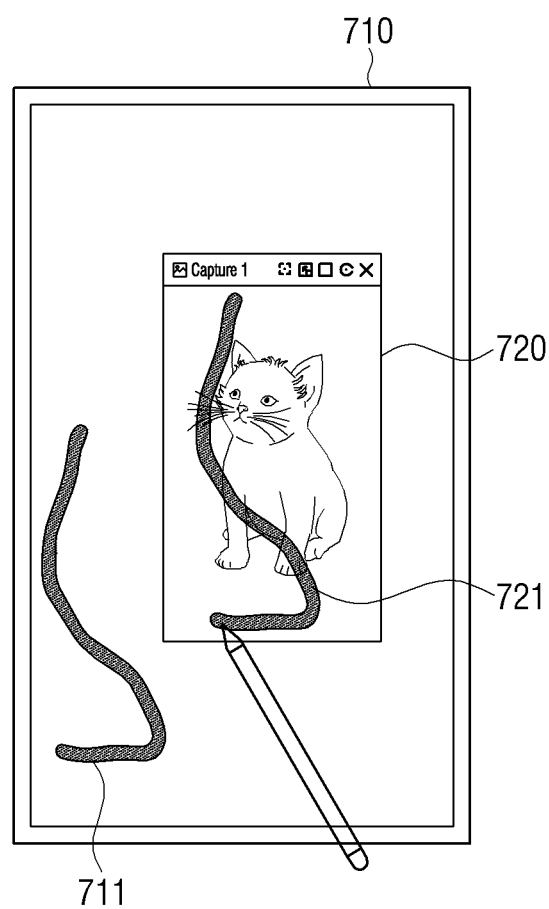
FIG. 7A is a diagram illustrating an embodiment of displaying writing information when the display magnification of the image window is 100% according to an embodiment.
Figure 7B:
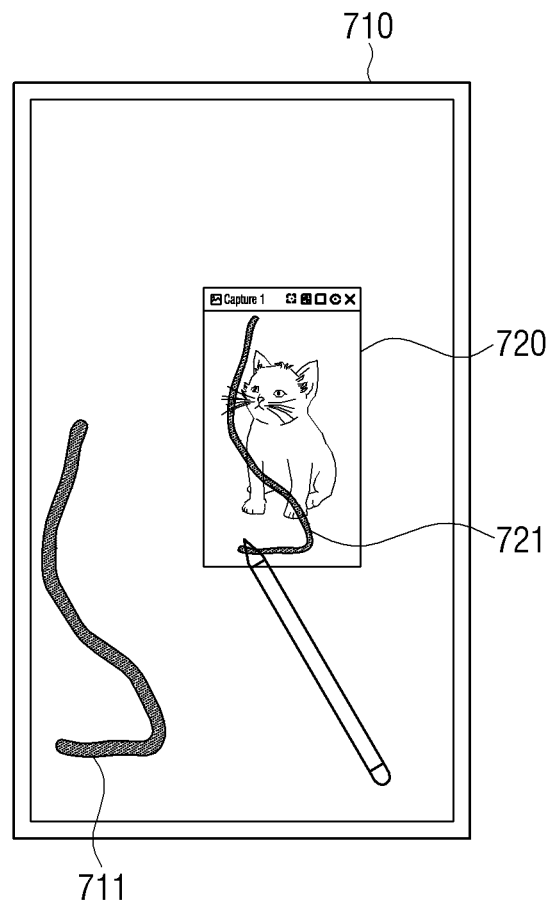
FIG. 7B is a diagram illustrating an embodiment of displaying writing information when display magnification of the image window is reduced while writing information is displayed, according to an embodiment.
Figure 7C:
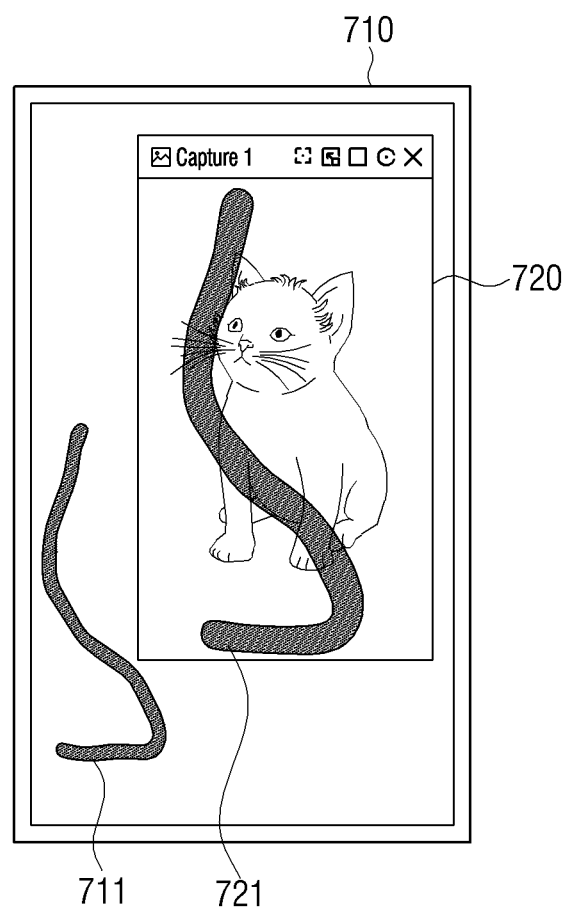
FIG. 7C is a diagram illustrating an embodiment of displaying writing information when display magnification of the image window increases while writing information is displayed according to an embodiment.

When a user command to change the display magnification of the image window is input while the writing information of the second thickness is displayed on the image window, the electronic apparatus 100 may maintain the writing of the writing information as the second thickness, relative to the image window, while changing the display magnification of the image window according to the user command. As illustrated in FIG. 7A, when the first writing information 711 is displayed on the writing area 710 and the second writing information 721 is displayed on the image window 720, if the user command to reduce the display magnification of the image window 720 is input, the electronic apparatus 100 may reduce the size of the image window 720 and maintain the thickness of the second writing information 721 displayed in the image window 720 relative to the image window 720, as shown in FIG. 7B. To the user, the thickness of the second writing information 721 displayed on the image window 720 may appear to be decreasing such that the brightness of the second writing information 721 displayed in the image window 720 also appears to be reduced. As illustrated in FIG. 7A, while the first writing information 711 is displayed on the writing area 710 and the second writing information 721 is displayed on the image window 720, when the user command to increase the display magnification of the image window 720 is input, the electronic apparatus 100 may reduce the size of the image window 720 but maintain the thickness of the second writing information 721 displayed in the image window 720 relative to the image window 720, as illustrated in FIG. 7C. To the user, it may appear that the thickness of the second writing information 721 displayed in the image window 720 increases as well.

When an additional user input for writing is detected on the image window in which the display magnification is changed, the electronic apparatus 100 may display the writing information corresponding to the user input on the image window based on the third thickness determined according to the first thickness and the changed display magnification. In this example, the third thickness may be different from the second thickness.

Figure 8A:
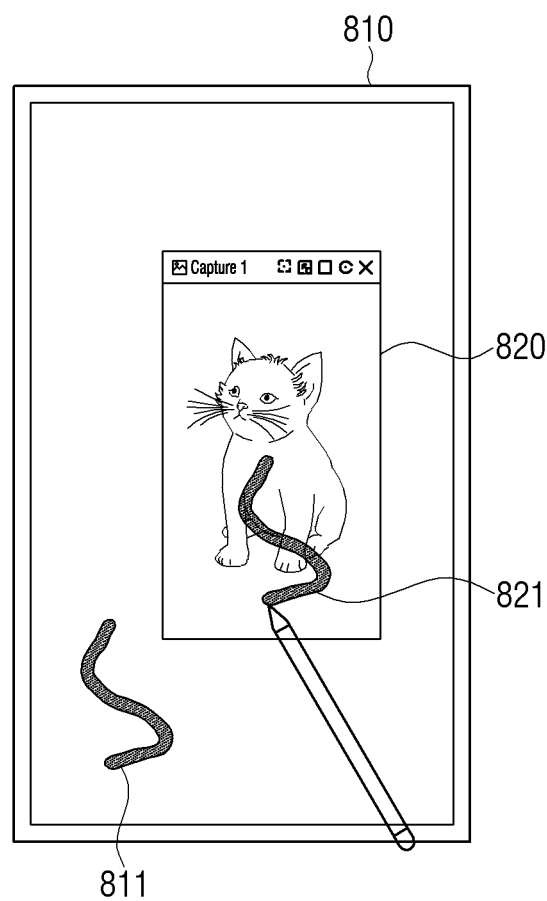
FIG. 8A is a diagram illustrating an embodiment of displaying writing information when display magnification of the image window is 100% according to an embodiment.
Figure 8B:
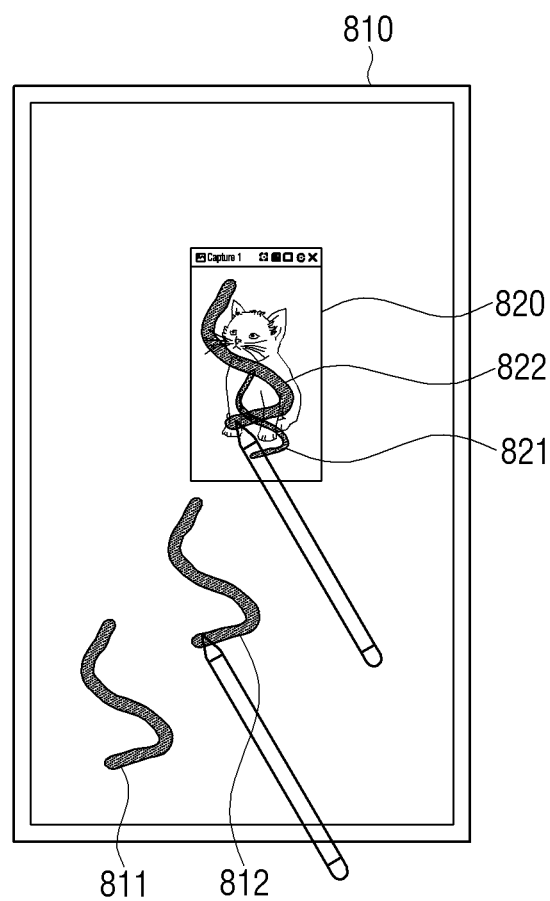
FIG. 8B is a diagram illustrating an embodiment of displaying additional writing information when a user input for additional writing information after display magnification of the image window is decreased according to an embodiment.

As illustrated in FIG. 8A, while first writing information $11 is displayed on a writing area 810 and second writing information 821 is displayed on an image window 820, when a user command to reduce the display magnification of the image window 820 is input, the electronic apparatus 100 may reduce the size of the image window 820, as illustrated in FIG. 8B, but maintain the thickness of the second writing information 821 displayed in the image window 820 relative to the image window 820. In this example, the electronic apparatus 100 may detect additional user input to further display writing information. When an additional user input is detected in the writing area 810 to display third writing information 812, the electronic apparatus 100 may display the third writing information 812 with the preset first thickness, and if an additional user input is detected on the image window 820 to display fourth writing information 822, the electronic apparatus 100 may display the fourth writing information 822 with a third thickness determined according to the display magnification of the preset first thickness and the current reduced image window 820. In this example, the third thickness of the fourth writing information 822 may be larger than the second thickness of the existing second writing information 821.

Figure 8C:
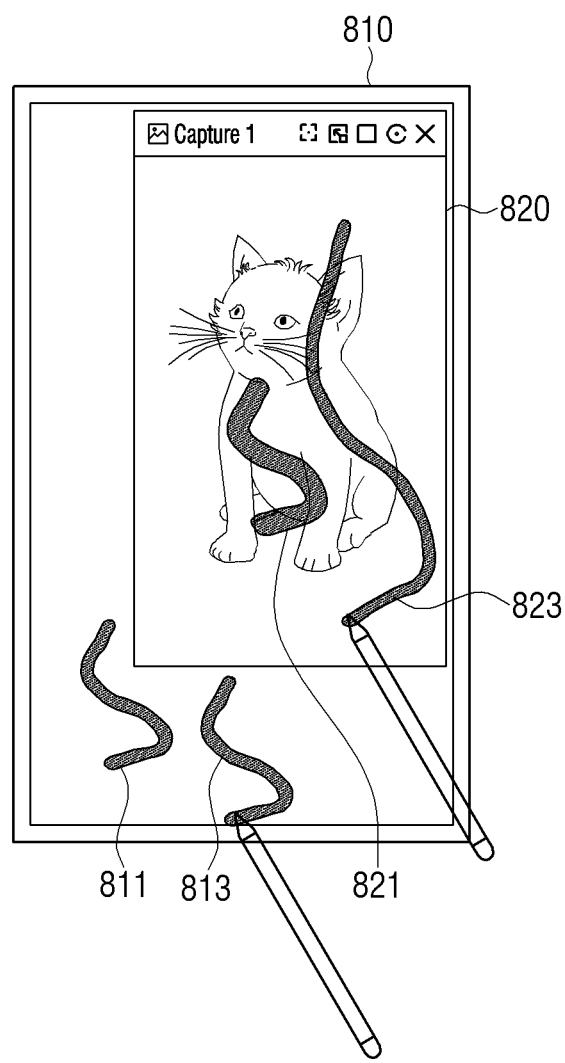
FIG. 8C is a diagram illustrating an embodiment of displaying additional writing information when a user input for additional writing information is detected after display magnification of an image window increases according to an embodiment.

As illustrated in FIG. 8A, when a user command to increase the display magnification of the image window 820 is input while the first writing information 811 is displayed on the writing area 810 and the second writing information 821 is displayed on the image window 820, the electronic apparatus 100 may increase the size of the image window 820, but maintain the thickness of the second writing information 821 displayed in the image window 820 relative to the image window 820, as shown in FIG. 8C. In this example, the electronic apparatus 100 may detect additional user input to further display writing information. When an additional user input is detected in the writing area 810 to display fifth writing information 813, the electronic apparatus 100 may display the fifth writing information 813 with the predetermined first thickness, and if an additional user input is detected on the image window 820 to display sixth writing information, the electronic apparatus 100 may display the sixth writing information 823 of a fourth thickness determined according to the display magnification of the preset first thickness and the currently increased image window 820. In this example, the fourth thickness of the sixth writing information 823 may be thinner than the second thickness of the second writing information 821.

Figure 9:
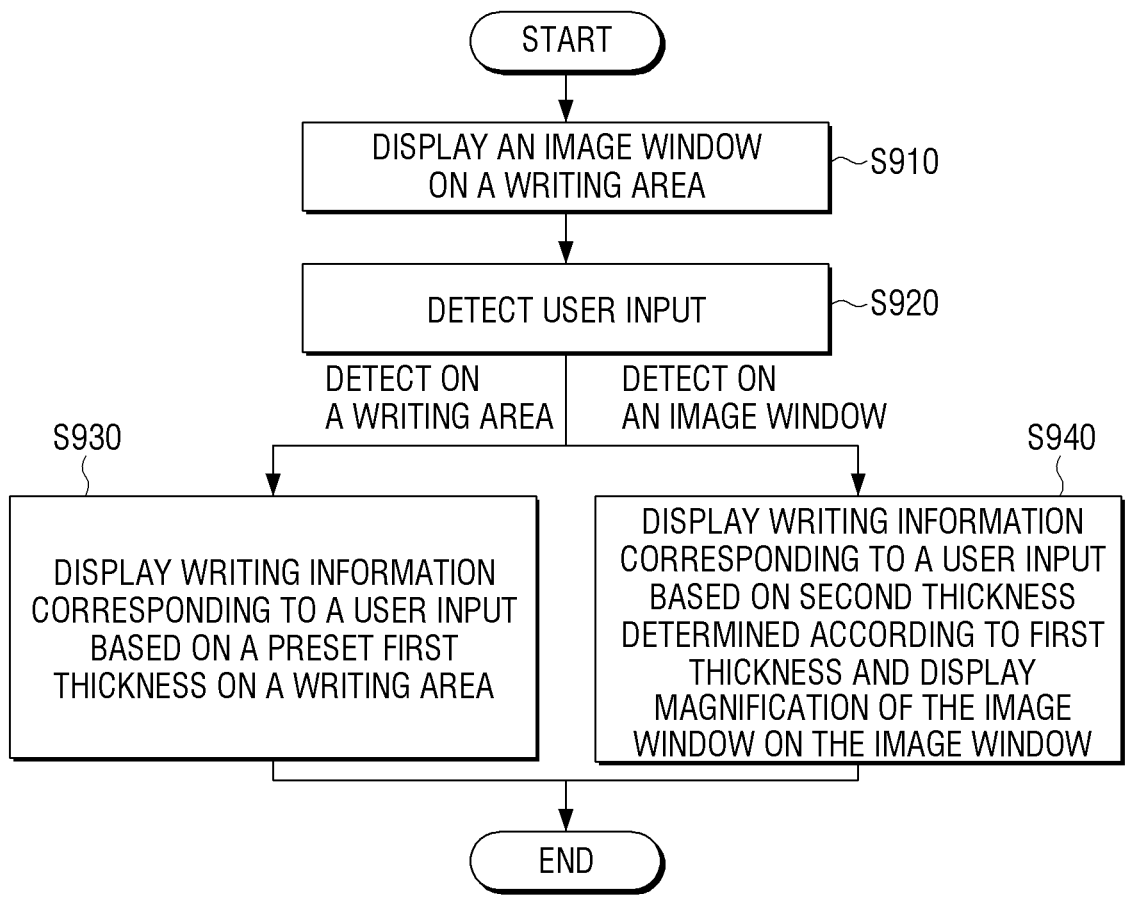
FIG. 9 is a flow chart illustrating a method for controlling an electronic apparatus according to an embodiment.

FIG. 9 is a flow chart illustrating a method for controlling an electronic apparatus according to an embodiment.

The electronic apparatus 100 may display an image window on the writing area in operation S910. The electronic apparatus 100 may display an image window including a captured image or an image stored in an external device on a writing area as illustrated in FIGS. 5A to 5C.

The electronic apparatus 100 may detect a user input to display writing information in operation S920.

If the user input is detected on the writing area, the electronic apparatus 100 may display the writing information corresponding to the user input in the writing area based on the preset first thickness in operation S930.

When the user input is detected on the image window, the electronic apparatus 100 may display the writing information corresponding to the user input on the image window on the basis of the second thickness determined according to the first thickness and display magnification of the image window in operation S940. The second thickness may be determined according to the display magnification of the image window so that the second thickness may look the same as the first thickness displayed in the writing area, and if the display magnification of the image window is greater than 100%, the second thickness is determined to be thinner than the first thickness, and if the display magnification of the image window is 100%, the second thickness is determined to be the same as the first thickness, and if the display magnification of the image window is less than 100%, the second thickness may be determined to be greater than the first thickness. According to the various embodiments described above, it is possible to increase the usability of an electronic blackboard to a user by displaying writing information of different thickness according to the display magnification of the imam window.

Various embodiments of the disclosure may be implemented in software, including instructions stored on machine-readable storage media readable by a machine e.g., a computer). An apparatus may read and load instructions from the storage medium, and execute the called instruction, including an electronic apparatus (for example, electronic apparatus 100) according to the disclosed embodiments. When the instructions are executed by a processor, the processor may perform a function corresponding to the instructions directly or by using other components under the control of the processor. The instructions may include a code generated by a compiler or a code executable by an interpreter A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some sub-elements of the abovementioned sub-elements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, or at least one other operations may be added.

What is claimed is:

1. A method for controlling an electronic apparatus, the method comprising:
    displaying an image window on a first part of a writing area of a display;
    displaying, based on a first user input for writing being detected on a second part of the writing area that is outside the image window, first writing information corresponding to the first user input on the writing area with a first thickness that is predetermined;
    displaying, based on a second user input for writing being detected on the image window, second writing information corresponding to the second user input on the image window with a second thickness that is set according to the first thickness and a display magnification of the image window;
    changing the display magnification of the image window based on a third user input to change the display magnification being received while the second writing information of the second thickness is displayed on the image window; and
    setting the second thickness based on the changed display magnification of the image window such that the second writing information displayed appears to have a same thickness as the first writing information having the first thickness displayed on the second part of the writing area.

2. The method of claim 1, wherein the setting the second thickness comprises setting the second thickness to be thinner than the first thickness based on the display magnification of the image window exceeding 100%.

3. The method of claim 1, wherein the setting the second thickness comprises setting the second thickness to be the same as the first thickness based on the display magnification of the image window being 100%.

4. The method of claim 1, wherein the determining the second thickness comprises setting the second thickness to be thicker than the first thickness based on the display magnification of the image window being less than 100%.

5. The method of claim 1, wherein the second thickness is set based on the following equation:

$$\text{the second thickness} = \frac{\text{the first thickness}}{\text{the display magnification of the image window}}$$

6. The method of claim 1, further comprising:
    displaying, based on a fourth user input for writing being detected on the image window of which the display magnification is changed, displaying third writing information corresponding to the fourth user input on the image window with a third thickness set according to the first thickness and the changed display magnification,
    wherein the third thickness is different from the second thickness.

7. The method of claim 6, further comprising:
    setting the third thickness to have a thickness smaller than the second thickness based on the display magnification being increased.

8. The method of claim 6, further comprising:
    setting the third thickness to have a thickness greater than the second thickness based on the display magnification being decreased.

9. The method of claim 1, wherein
    the first writing information of the first thickness is displayed on a first image layer corresponding to the writing area, and
    the second writing information of the second thickness is displayed on a second image layer, corresponding to the image window, that is different from the first image layer.

10. An electronic apparatus, comprising:
    a display;
    a touch panel;
    a memory comprising at least one instruction; and
    at least one processor connected to the display, the touch panel, and the memory,
    wherein the at least one instruction, when executed by the at least one processor, is configured to cause the at least one processor to:
        control the display to display an image window on a first part of a writing area of the display, detect user inputs for writing via the touch panel while the image window is displayed on the writing area, control the display to display, based on a first user input for writing being detected on a second part of the writing area that is outside the image window, first writing information corresponding to the first user input on the writing area with a first thickness that is predetermined, control the display to display, based on a second user input for writing being detected on the image window, second writing information corresponding to the second user input on the image window with a second thickness that is determined according to the first thickness and a display magnification of the image window, change the display magnification of the image window based on a third user input to change the display magnification being received while the second writing information of the second thickness is displayed on the image window, and set the second thickness based on the changed display magnification of the image window such that the second writing information displayed appears to have a same thickness as the first writing information having the first thickness displayed on the second part of the writing area.

11. The electronic apparatus of claim 10, wherein the at least one instruction is further configured to cause the at least one processor to:

set the second thickness to be thinner than the first thickness based on the display magnification of the image window exceeding 100%, set the second thickness to be the same as the first thickness based on the display magnification of the image window being 100%, and set the second thickness to be thicker than the first thickness based on the display magnification of the image window being less than 100%.

12. The electronic apparatus of claim 10, wherein the second thickness is set based on the following equation:

$$\text{the second thickness} = \frac{\text{the first thickness}}{\text{the display magnification of the image window}}$$

13. The electronic apparatus of claim 10, wherein the at least one instruction is further configured to cause the at least one processor to:

control the display to display third writing information, corresponding to a fourth user input on the image window, with a third thickness set according to the first thickness and the changed display magnification, wherein the third thickness is different from the second thickness.

14. The electronic apparatus of claim 13, wherein the at least one instruction is further configured to cause the at least one processor to:

set the third thickness to have a thickness smaller than the second thickness based on the display magnification being increased, and set the third thickness to have a thickness greater than the second thickness based on the display magnification being decreased.

15. The electronic apparatus of claim 10, wherein the at least one instruction is further configured to cause the at least one processor to:

control the display to display the first writing information of the first thickness on a first image layer corresponding to the writing area, and control the display to display the second writing information of the second thickness on a second image layer, corresponding to the image window, that is different from the first image layer.

16. A non-transitory computer-readable storage medium storing instructions that cause at least one processor to:

display an image window on a first part of a writing area of a display;

display, based on a first user input for writing being detected on a second part of the writing area that is outside the image window, first writing information corresponding to the first user input on the writing area with a first thickness that is predetermined;

display, based on a second user input for writing being detected on the image window, second writing information corresponding to the second user input on the image window with a second thickness that is determined according to the first thickness and a display magnification of the image window;

change the display magnification of the image window based on a third user input to change the display magnification being received while the second writing information of the second thickness is displayed on the image window; and set the second thickness based on the changed display magnification of the image window such that the second writing information displayed appears to have a same thickness as the first writing information having the first thickness displayed on the second part of the writing area.

* * * * *